(12) United States Patent
Ye et al.

(10) Patent No.: US 7,380,937 B2
(45) Date of Patent: Jun. 3, 2008

(54) SERIES OF ASPHERICAL CONTACT LENSES

(75) Inventors: Ming Ye, Fort Worth, TX (US); Curtis Dean McKenney, Duluth, GA (US); John McNally, Atlanta, GA (US)

(73) Assignee: Novartis AG, Basel (CH)

( * ) Notice: Subject to any disclaimer, the term of this patent is extended or adjusted under 35 U.S.C. 154(b) by 285 days.

(21) Appl. No.: 11/284,753

(22) Filed: Nov. 21, 2005

(65) Prior Publication Data

US 2006/0109421 A1 May 25, 2006

Related U.S. Application Data

(60) Provisional application No. 60/629,904, filed on Nov. 22, 2004.

(51) Int. Cl.
*G02C 7/04* (2006.01)

(52) U.S. Cl. .................................. 351/160 R; 351/177

(58) Field of Classification Search ..... 351/160 R–160 H, 177
See application file for complete search history.

(56) References Cited

U.S. PATENT DOCUMENTS

| | | | |
|---|---|---|---|
| 4,195,919 A | 4/1980 | Shelton | 351/160 |
| 5,771,088 A | 6/1998 | Perrott | 351/161 |
| 5,815,239 A * | 9/1998 | Chapman et al. | 351/177 |
| 6,726,323 B2 * | 4/2004 | Miyamura et al. | 351/160 R |
| 7,147,325 B2 * | 12/2006 | Gotou et al. | 351/160 R |

OTHER PUBLICATIONS

International Search Report.

* cited by examiner

*Primary Examiner*—Scott J. Sugarman
*Assistant Examiner*—Darryl J Collins
(74) *Attorney, Agent, or Firm*—Jian Zhou; Robert Ambrose

(57) ABSTRACT

The present invention provides a series of aspherical contact lenses, each lens having a first central optical zone on its anterior surface and a second central optical zone on its posterior surface. Both central optical zones are aspherical surfaces. The first central optical zone is designed to have a surface which provides a target optical power and an optical power profile selected from the group consisting of (1) a substantially constant optical power profile, (2) a power profile mimicking the optical power profile of a spherical lens with an identical targeted optical power, and (3) a power profile in which lens spherical aberration at 6 mm diameter is from about 0.65 diopter to about 1.8 diopters more negative than spherical aberration at 4 mm diameter.

18 Claims, 1 Drawing Sheet

SERIES OF ASPHERICAL CONTACT LENSES

This application claims the benefit under 35 USC § 119 (e) of U.S. provisional application No. 60/629,904 filed Nov. 22, 2004, incorporated by reference in its entirety.

This invention is related to a series of contact lenses. In particular, to a series of contact lenses capable of achieving better lens fitting on an eye and having a controlled spherical aberration incorporated therein.

BACKGROUND

Contact lenses are widely used for correcting defects such as near-sightedness and far-sightedness (myopia and hypermetropia, respectively). Most contact lenses available on the market for correcting myopia or hypermetropia typically have spherical designs, namely, each contact lens having a spherical anterior surface and a spherical posterior surface. Although contact lenses with spherical lens design provide acceptable visual acuity, there are several disadvantages associated with such traditional design. First, a spherical lens design may lead to an inadequate lens fitting on an eye, since human cornea generally has an aspherical surface. Second, a spherical lens design can introduce undesirable spherical aberrations into a lens due to its geometry and thereby decrease visual acuity. By providing a lens surface with asphericity, one may be able to eliminate spherical aberrations. However, by eliminating spherical aberrations of a lens, the optical power profile of a contact lens is inadvertently changed and as such, the apparent optical power at a given aperture (e.g., 4 mm pupil size) of a lens may no longer be the desired and targeted optical power. Such changes in apparent optical powers may greatly hinder a eye-care practitioner to correctly prescribe a contact lens to a patient.

Therefore, there is a need for contact lenses which provide good lens fitting and have controlled lens spherical aberrations.

SUMMARY OF THE INVENTION

The invention provides a series of contact lenses having an optical power ranging from about −15 to about 10 diopters (D). Each lens comprises an anterior surface having a first central optical zone and an opposite posterior surface having a second central optical zone. The first and second central optical zones each are aspherical surfaces. The first central optical zone of each lens has an aspherical design that, in combination with the second central optical zone, provides an optical power profile selected from the group consisting of (1) a substantially constant optical power profile, (2) a power profile mimicking the optical power profile of a spherical lens with identical targeted optical power, and (3) a power profile in which lens spherical aberration at 6 mm diameter is from about 0.65 diopter to about 1.8 diopters more negative than spherical aberration at 4 mm diameter.

The invention also provides a series of aspherical contact lenses having an optical power ranging from about −15 diopters to about −6 diopters, wherein each lens comprises an anterior surface having a first central optical zone and an opposite posterior surface having a second central optical zone. One of the first and second central optical zones is a spherical surface while the other is an aspherical surface. The aspherical surface has a design that, in combination with the spherical surface, provides an optical power profile in which lens spherical aberration at 6 mm diameter is from about 0.65 diopter to about 1.8 diopters more negative than spherical aberration at 4 mm diameter.

The invention further provides method for producing a series of contact lenses of the invention.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE PREFERRED EMBODIMENTS

Figure 1:
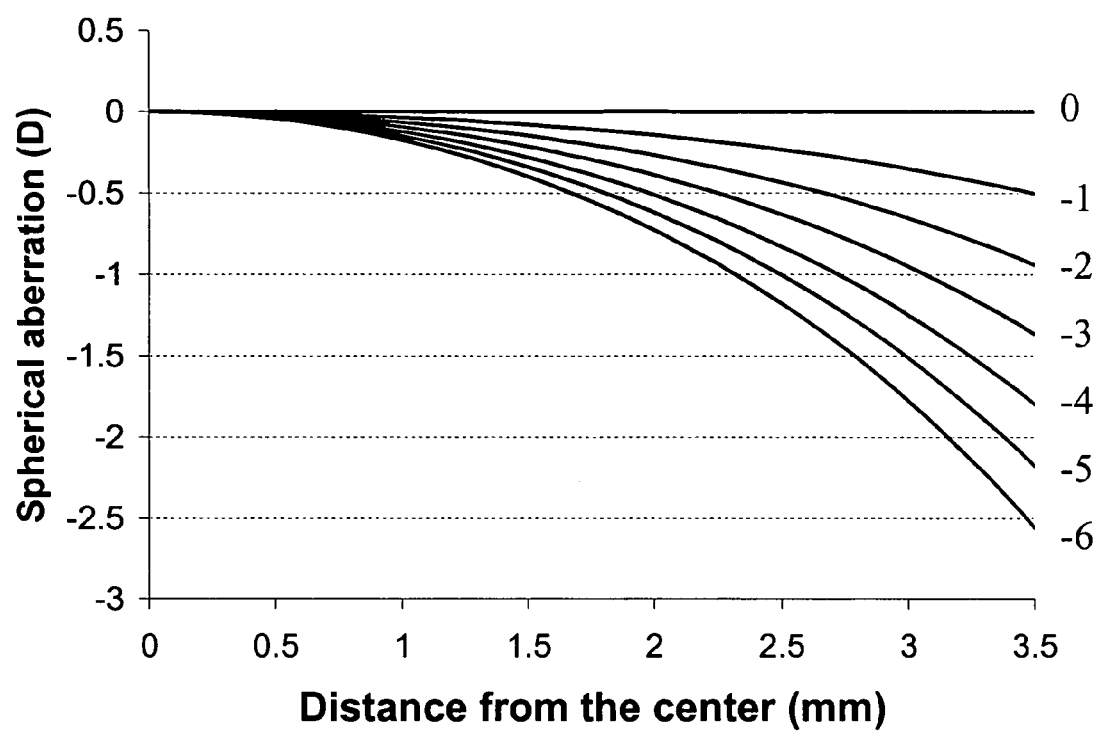
FIG. 1 schematically shows a spherical aberration profile of a series of contact lenses according to a preferred embodiment of the invention.

Reference now will be made in detail to the embodiments of the invention. It will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents. Other objects, features and aspects of the present invention are disclosed in or are obvious from the following detailed description. It is to be understood by one of ordinary skill in the art that the present discussion is a description of exemplary embodiments only, and is not intended as limiting the broader aspects of the present invention.

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well known and commonly employed in the art.

The invention is related to a series of contact lenses having optical power ranging from about −15 to about 10 diopters (D), preferably from about −10 diopters to 10 diopters. Each lens comprises an anterior surface having a first central optical zone and an opposite posterior surface having a second central optical zone. The first and second central optical zones each are aspherical surfaces. The first central optical zone of each lens has an aspherical design that, in combination with the second central optical zone, provides an optical power profile selected from the group consisting of (1) a substantially constant optical power profile, (2) a power profile mimicking the optical power profile of a spherical lens with identical targeted optical power, and (3) a power profile in which lens spherical aberration at 6 mm diameter is from about 0.65 diopter to about 1.8 diopters more negative than spherical aberration at 4 mm diameter.

As used herein, an "aspherical surface" is intended to describe a rotationally symmetrical surface which is not spherical.

A "spherical contact lens" is intended to describe a contact lens having a central optical zone the two opposite surface of which are spherical (i.e., each can be defined by a spherical mathematical function).

A "targeted optical power" in reference to a contact lens means an optical power prescribed by an eye-care practitioner to provide a negative or positive spherical correction. Traditionally, the targeted optical power corresponds to the optical power at the center of a contact lens.

A "optical power profile" or "power profile" in reference to a contact lens is intended to describe variations of optical power from the center to the edge of the central optical zone of the contact lens.

"Spherical aberration" in reference to a lens means that the optical power of the lens varies with the distance from the central axis (diameter), deviates from the ideal optical power (i.e., at the center of the lens), and is rotationally symmetric around the central axis. A negative spherical aberration is intended to describe that the optical power of a lens at any diameter is smaller (or more negative) than the optical power of the lens at the center. A positive spherical aberration is intended to describe that the optical power of a lens at any diameter is larger (or more positive) than the optical power of the lens at the center.

A "spherical aberration profile" in reference to a contact lens is intended to describe variations of spherical aberration from the center to the edge of the central optical zone of the contact lens.

A "substantially constant power profile" in reference to a contact lens is intended to describe a power profile in which spherical aberration at any diameter (distance from the center of the optical zone) within a 6 mm-diameter optical zone is between about −0.1 diopter to about 0.1 diopter.

The second central optical zone of the posterior surface preferably is a conic surface defined by a mathematical function $$S_1 = \frac{c_1 x^2}{1 + \sqrt{1 - (1+k_1)c_1^2 x^2}} \quad (1)$$

in which $S_1$ is the saggital height, $c_1$ is the apical curvature (the reciprocal of the apical radius), x is the radial distance from the apex, and $k_1$ is a conic constant. A conic surface may more adequately fit to the topography of the cornea of an eye and may provide a wearer better comfort. More preferably, all of the lens in the series has a common design of the second central optical zone.

The first central optical zone of the anterior surface preferably is a surface defined by $$S_2 = \frac{c_2 x^2}{1 + \sqrt{1 - (1+k_2)c_2^2 x^2}} + \alpha_1 x^2 + \quad (2)$$
$$\alpha_2 x^4 + \alpha_3 x^6 + \alpha_4 x^8 + \alpha_5 x^{10} + \alpha_6 x^{12} + \alpha_7 x^{14}$$

in which $S_2$ is the saggital height, $c_2$ is the apical curvature (the reciprocal of the apical radius), x is the radial distance from the apex, $k_2$ is a conic constant, and $\alpha_1$ to $\alpha_7$ are the coefficients.

It is well known to those skilled in the art that the optical power of a contact lens is, inter alia, a function of the index of refraction of the lens material and the algebraic difference between the curvatures of the anterior surface and the posterior surface of the lens. The first central optical zone and the second central optical zone combine to provide an optical power to correct myopia or hypermetropia. Any power profile can be obtained by adjusting one or more of c, k, and $\alpha_1$ to $\alpha_7$ in equation (2).

In a preferred embodiment, where a contact lens in the series has a targeted optical power of from 0 to about 10 diopters, it has a substantially constant power profile.

In another preferred embodiment, where a contact lens in the series has a targeted optical power of from about −1 to about −6 diopters, it has a power profile mimicking the optical power profile of a spherical lens with identical targeted optical power.

In a further preferred embodiment, where a contact lens in the series has a targeted optical power of from about −6 diopters to about −15 diopters, preferably from about −6 diopters to about −10 diopters, it has a power profile in which lens spherical aberration at 6 mm diameter is from about 0.65 diopter to about 1.8 diopters, more preferably from about 0.9 to about 1.4, more negative than spherical aberration at 4 mm diameter. Even more preferably, the lens has a constant spherical aberration profile which is substantially identical that of a lens having −6 diopters.

It is discovered that for a piano contact lens or a contact lens with positive optical power, eliminating lens spherical aberration would not change substantially the apparent optical power of the lens while providing a better visual acuity.

It is also discovered that for a contact lens having an optical power of from about −1 to about −6, eliminating lens spherical aberration would decrease significantly (i.e., relatively of percentage of changes) the apparent optical power of the lens at a relatively larger aperture. Such lens may not be able to provide a traditionally defined targeted optical power. Since eye-care practitioners typically prescribe lenses for patients based on the traditional definition of targeted powers, contact lens without spherical aberration and having an targeted optical power of from about −1 diopter to about −10 diopters may not be able to provide a good visual acuity. It is well known that a spherical contact lens having a targeted optical power of from about −1 diopter to about −10 diopters inherently has negative spherical aberrations. Introducing additional negative spherical aberrations into a spherical contact lens for correcting the intrinsic spherical aberration of an human eye may also alter the apparent optical power. Therefore, there is a need for balancing between the need to control lens spherical aberrations and the need to maintain a traditionally defined targeted optical power. It is most beneficial for an aspherical contact lens having an optical power of from about −1 diopter to about −6 diopters to has an optical power profile mimicking (or closely resembling to or substantially identical to) that of a spherical lens having identical targeted optical power.

It is further discovered that for a high minus contact lens (i.e., having an optical power of from about −6 to about −15, better visual acuity could be achieved by introducing a spherical aberration at 4 mm diameter of from about −0.65 to about −1.2 diopters and a spherical aberration at 6 mm diameter of from about −1.6 to about −2.4 diopters. It is believed that a larger population of human eyes generally have a spherical aberration at 4 mm diameter of from about 0.65 to about 1.2 diopters and a spherical aberration at 6 mm diameter of from about 1.6 to about 2.4 diopters. Incorporation of such amount of spherical aberration in a contact lens having a targeted optical power of more negative than −6 diopters may provide a better acuity while causing a tolerable percentage of changes in apparent optical power. Where a lens has a targeted optical power within the range of −1 diopter to −6 diopters, the percentage of changes in apparent optical power may not be tolerable to a patient.

The first and second central optical zones can have a shape of any conventional lens. Preferably, it is circular. More preferably, it is substantially concentric with the central axis. The first and second central optical zones can have identical and different size. Typically, the size of either of the two optical zones can be from about 5 mm to 10 mm in diameter, preferably from about 6 mm to 8 mm in diameter.

In a preferred embodiment, both the first central optical zone on the anterior surface and the second central optical zone on the posterior surface are substantially concentric with a central axis.

It is understood that each lens in the series of contact lenses can have one or more non-optical zones which surround the central optical zone. A person skill in the art will know well how to incorporate a family of common non-optical zones into a lens design.

FIG. 1 schematically illustrates power profiles of a series of contact lenses according to a preferred embodiment. This series of lenses are divided into three sub-series, a first sub-series of lens having an optical power of from about plano (0) to 10 diopters, a second sub-series of lenses having an optical power of from about −1 to about −6 diopters, and a third sub-series of lens having an optical power of from about −7 to −15 diopters. The X-axis represents a distance from the lens center. The Y-axis represents differences in optical power between at any position other than the lens center and at the lens center. The targeted optical powers are plano, −1, −2, −3, −4, −5, and −6 respectively from the top to the bottom in FIG. 1. These power profiles are almost identical to the power profiles of spherical lenses with corresponding targeted optical power. Each lens in the first sub-series has a power profile identical to that of the plano lens. Each lens in the second sub-series has one of the power profile shown in FIG. 1 for a given targeted optical power. Each lens in the third sub-series has a spherical aberration profile substantially identical to that of a lens having an optical power of −6 diopters.

By using an optical computer aided design (CAD) system and a mechanical CAD system, one can design each lens in a series of contact lenses of the invention. An optical CAD system is used to design an optical model lens. "An optical model lens" refers to an ophthalmic lens that is designed in a computer system and generally does not contain other non-optical systems which are parts of an ophthalmic lens. Exemplary non-optical systems of a contact lens include, but are not limited to bevel, peripheral blending zone, peripheral zone, lenticular, and edge that joins the anterior and posterior surfaces of a contact lens.

"A bevel" refers to a non-optical surface zone located at the edge of the posterior surface of a contact lens. Generally, the bevel is a significantly flatter curve and is usually blended with the base curve (optical posterior surface) of a contact lens and appears as an upward taper near the edge. This keeps the steeper base curve radius from gripping the eye and allows the edge to lift slightly. This edge lift is important for the proper flow of tears across the cornea and makes the lens fit more comfortable.

"A lenticular" refers to a non-optical surface zone of the anterior surface of a contact lens adjacent to the edge. The primary function of the lenticular is to control the thickness of the lens edge.

Any known, suitable optical computer aided design (CAD) system may be used to design an optical model lens. Exemplary optical computer aided design systems includes, but are not limited to Advanced System Analysis program (ASAP) from Breault Research Organization and ZEMAX (Focus Software, Inc.). Preferably, the optical design will be performed using Advanced System Analysis program (ASAP) from Breault Research Organization with input from ZEMAX (Focus Software, Inc.).

The design of the optical model lens can be transformed by, for example, a mechanical CAD system, into a mechanical lens design that includes optical zones, non-optical zones and non-optical features. Preferably, when transforming the design of an optimized optical model lens into a mechanical lens design, some common features of a family of contact lenses can be incorporated, such as, for example, bevel, peripheral zone, lenticular, and edge. A peripheral blending zone can be utilized to smoothly blend the central optical zone to non-optical zones on the anterior and posterior surfaces.

Any know, suitable mechanical CAD system can be used in the invention. Preferably, a mechanical CAD system capable of representing precisely and mathematically high order surfaces is used to design a contact lens. An example of such mechanical CAD system is Pro/Engineer.

A series of contact lenses of the invention can be either hard or soft lenses. Soft contact lenses of the invention is preferably made from a soft contact lens material, such as hydrogels. Any known suitable hydrogels can be used in the invention. Preferably, a silicone-containing hydrogel is used in the invention. It will be understood that any lens described above comprising any soft contact lens material would fall within the scope of the invention.

After completing a desired design, contact lenses of the invention can be produced in a computer-controlled manufacturing system. A computer-controlled manufacturing device is a device that can be controlled by a computer system and that is capable of producing directly an ophthalmic lens or an optical tools for producing an ophthalmic lens. Any known, suitable computer controllable manufacturing device can be used in the invention. A computer controllable manufacturing device is preferably a numerically controlled lathe, more preferably a two-axis lathe with a 45° piezo cutter or a lathe apparatus disclosed by Durazo and Morgan in U.S. Pat. No. 6,122,999, herein incorporated by reference in its entirety, even more preferably a numerically controlled lathe from Precitech, Inc., for example, such as Optoform ultra-precision lathes (models 30, 40, 50 and 80) having Variform piezo-ceramic fast tool servo attachment.

Contact lenses of the invention may be produced by any convenient means, for example, such as lathing and molding. Preferably, contact lenses are molded from contact lens molds including molding surfaces that replicate the contact lens surfaces when a lens is cast in the molds. For example, an optical cutting tool with a numerically controlled lathe may be used to form metallic optical tools. The tools are then used to make convex and concave surface molds that are then used, in conjunction with each other, to form the lenses of the invention using a suitable liquid lens-forming material placed between the molds followed by compression and curing of the lens-forming material.

Accordingly, contact lenses according to the invention can be manufactured by providing contact lens molds with two molding surfaces, a first molding surface and a second molding surface. The molds having the first molding surface or the second molding surface, in conjunction with each other, form each of a series of contact lenses, each comprising a concave (posterior) surface having a first central optical zone and a convex (anterior) surface having a second central optical zone, wherein the first central optical zone and the second central optical zone combine to provide a targeted optical power to correct myopia or hypermetropia and an optical power profile selected from the group consisting of (1) a substantially constant optical power profile, (2) a power profile mimicking the optical power profile of a spherical lens with identical targeted optical power, and (3) a power profile in which lens spherical aberration at 6 mm diameter is from about 0.65 diopter to about 1.8 diopters more negative than spherical aberration at 4 mm diameter.

In another aspect, the present invention provides a method for producing a series of contact lenses of the invention. The method comprises the steps of shaping each contact lens in the series by a manufacturing means to have a concave (posterior) surface having a first central optical zone and a convex (anterior) surface having a second central optical zone, wherein the first central optical zone and the second central optical zone combine to provide a targeted optical power to correct myopia or hypermetropia and an optical power profile selected from the group consisting of (1) a substantially constant optical power profile, (2) a power profile mimicking the optical power profile of a spherical lens with identical targeted optical power, and (3) a power profile in which lens spherical aberration at 6 mm diameter is from about 0.65 diopter to about 1.8 diopters more negative than spherical aberration at 4 mm diameter.

The contact lenses of the invention can have better lens fitting on an eye and have controlled spherical aberration profile.

The invention is also related to a series of aspherical contact lenses-having an optical power ranging from about −15 diopters to about −6 diopters, wherein each lens comprises an anterior surface having a first central optical zone and an opposite posterior surface having a second central optical zone. One of the first and second central optical zones is a spherical surface while the other is an aspherical surface. The aspherical surface has a design that, in combination with the spherical surface, provides an optical power profile in which lens spherical aberration at 6 mm diameter is from about 0.65 diopter to about 1.8 diopters more negative than spherical aberration at 4 mm diameter.

The invention has been described in detail, with particular reference to certain preferred embodiments, in order to enable the reader to practice the invention without undue experimentation. A person having ordinary skill in the art will readily recognize that many of the previous components, compositions, and/or parameters may be varied or modified to a reasonable extent without departing from the scope and spirit of the invention. Furthermore, titles, headings, example materials or the like are provided to enhance the reader's comprehension of this document, and should not be read as limiting the scope of the present invention. Accordingly, the invention is defined by the following claims, and reasonable extensions and equivalents thereof.

What is claimed is:

1. A series of contact lenses, each lens in the series having a targeted optical power within the range of −15 diopters to 10 diopters for correcting myopia or hypermetropia, each lens in the series comprising an anterior surface having a first central optical zone and an opposite posterior surface having a second central optical zone, wherein the second central optical zones of all the lens in the series are substantially identical to each other and are aspherical surfaces, wherein the first central optical zone of each lens in the series has an aspherical design that, in combination with the second central optical zone, provides an optical power profile selected from the group consisting of (1) a substantially constant optical power profile, (2) a power profile mimicking the optical power profile of a spherical lens with an identical targeted optical power, and (3) a power profile in which lens spherical aberration at 6 mm diameter is from about 0.65 diopter to about 1.8 diopters more negative than spherical aberration at 4 mm diameter.

2. The series of contact lens of claim 1, wherein the second central optical zone of the posterior surface is a conic surface defined by eq. (1)

$$S_1 = \frac{c_1 x^2}{1 + \sqrt{1 - (1 + k_1)c_1^2 x^2}} \qquad (1)$$

in which $S_1$ is the saggital height, $c_1$ is the apical curvature (the reciprocal of the apical radius), x is the radial distance from the apex, and $k_1$ is a conic constant.

3. The series of contact lenses of claim 2, wherein the first central optical zone of the anterior surface is a surface defined by $$S_2 = \frac{c_2 x^2}{1 + \sqrt{1 - (1 + k_2)c_2^2 x^2}} + \alpha_1 x^2 + \\ \alpha_2 x^4 + \alpha_3 x^6 + \alpha_4 x^8 + \alpha_5 x^{10} + \alpha_6 x^{12} + \alpha_7 x^{14} \qquad (2)$$

in which $S_2$ is the saggital height, $c_2$ is the apical curvature (the reciprocal of the apical radius), x is the radial distance from the apex, $k_2$ is a conic constant, and $\alpha_1$ to $\alpha_7$ are the coefficients.

4. The series of contact lenses of claim 3, wherein each lens in the series having a targeted positive optical power has a substantially constant optical power profile.

5. The series of contact lenses of claim 3, wherein each lens in the series having a targeted optical power within the range of −1 to −6 has a power profile mimicking the optical power profile of a spherical lens with an identical targeted optical power.

6. The series of contact lenses of claim 3, wherein each lens in the series having a targeted optical power more negative than −6 diopters has a power profile in which lens spherical aberration at 6 mm diameter is from about 0.65 diopter to about 1.8 diopters more negative than spherical aberration at 4 mm diameter.

7. The series of contact lenses of claim 6, wherein the spherical aberration at 6 mm diameter is from about 0.9 diopters to about 1.4 diopters more negative than the spherical aberration at 4 mm diameter.

8. The series of contact lenses of claim 3, wherein each lens in the series having a targeted optical power more negative than −6 diopters has a substantially constant spherical aberration profile.

9. The series of contact lenses of claim 8, wherein the spherical aberration profile is substantially identical the spherical aberration profile of a spherical lens having a targeted optical power of −6 diopters.

10. The series of contact lenses of claim 3, each lens in the series having a targeted optical power within a range from −6 diopters to 6 diopters.

11. A method for making a series of contact lenses, comprising the steps of:

i) designing a posterior surface comprising a first central optical zone which is an aspherical surface defined by eq. (1)

$$S_1 = \frac{c_1 x^2}{1 + \sqrt{1 - (1+k_1)c_1^2 x^2}} \quad (1)$$

in which $S_1$ is the saggital height, $c_1$ is the apical curvature (the reciprocal of the apical radius), x is the radial distance from the apex, and $k_1$ is a conic constant;

ii) designing an anterior surface comprising a second central optical zone, wherein the second central optical zone is a surface defined by $$S_2 = \frac{c_2 x^2}{1 + \sqrt{1 - (1+k_2)c_2^2 x^2}} + \alpha_1 x^2 + \alpha_2 x^4 + \alpha_3 x^6 + \alpha_4 x^8 + \alpha_5 x^{10} + \alpha_6 x^{12} + \alpha_7 x^{14} \quad (2)$$

in which $S_2$ is the saggital height, $c_2$ is the apical curvature (the reciprocal of the apical radius), x is the radial distance from the apex, $k_2$ is a conic constant, and $\alpha_1$ to $\alpha_7$ are the coefficients;

iii) for each lens in the series adjusting one or more of $c_2$, $k_2$, and $\alpha_1$ to $\alpha_7$ while keeping $c_1$ and $k_1$ unchanged, so as to provide a targeted optical power within a range from −15 diopters to 10 diopters and an optical power profile selected from the group consisting of (1) a substantially constant optical power profile, (2) a power profile mimicking the optical power profile of a spherical lens with an identical targeted optical power, and (3) a power profile in which lens spherical aberration at 6 mm diameter is from about 0.65 diopter to about 1.8 diopters more negative than spherical aberration at 4 mm diameter; and iv) producing each lens in the series by lathing or molding.

12. The method of claim 11, wherein each lens in the series having a targeted positive optical power has a substantially constant optical power profile.

13. The method of claim 11, wherein each lens in the series having a targeted optical power within the range of −1 to −6 has a power profile mimicking the optical power profile of a spherical lens with identical targeted optical power.

14. The method of claim 11, wherein each lens in the series having a targeted optical power more negative than −6 diopters has a power profile in which lens spherical aberration at 6 mm diameter is from about 0.65 diopter to about 1.8 diopters more negative than spherical aberration at 4 mm diameter.

15. The method of claim 14, wherein the spherical aberration at 6 mm diameter is from about 0.9 diopters to about 1.4 diopters more negative than the spherical aberration at 4 mm diameter.

16. The method of claim 11, wherein each lens in the series having a targeted optical power more negative than −6 diopters has a substantially constant spherical aberration profile.

17. The method of claim 16, wherein the spherical aberration profile is substantially identical the spherical aberration profile of a spherical lens having a targeted optical power of −6 diopters.

18. The method of claim 11, each lens in the series having a targeted optical power within a range from −6 diopters to 6 diopters.

* * * * *